UNITED STATES PATENT OFFICE.

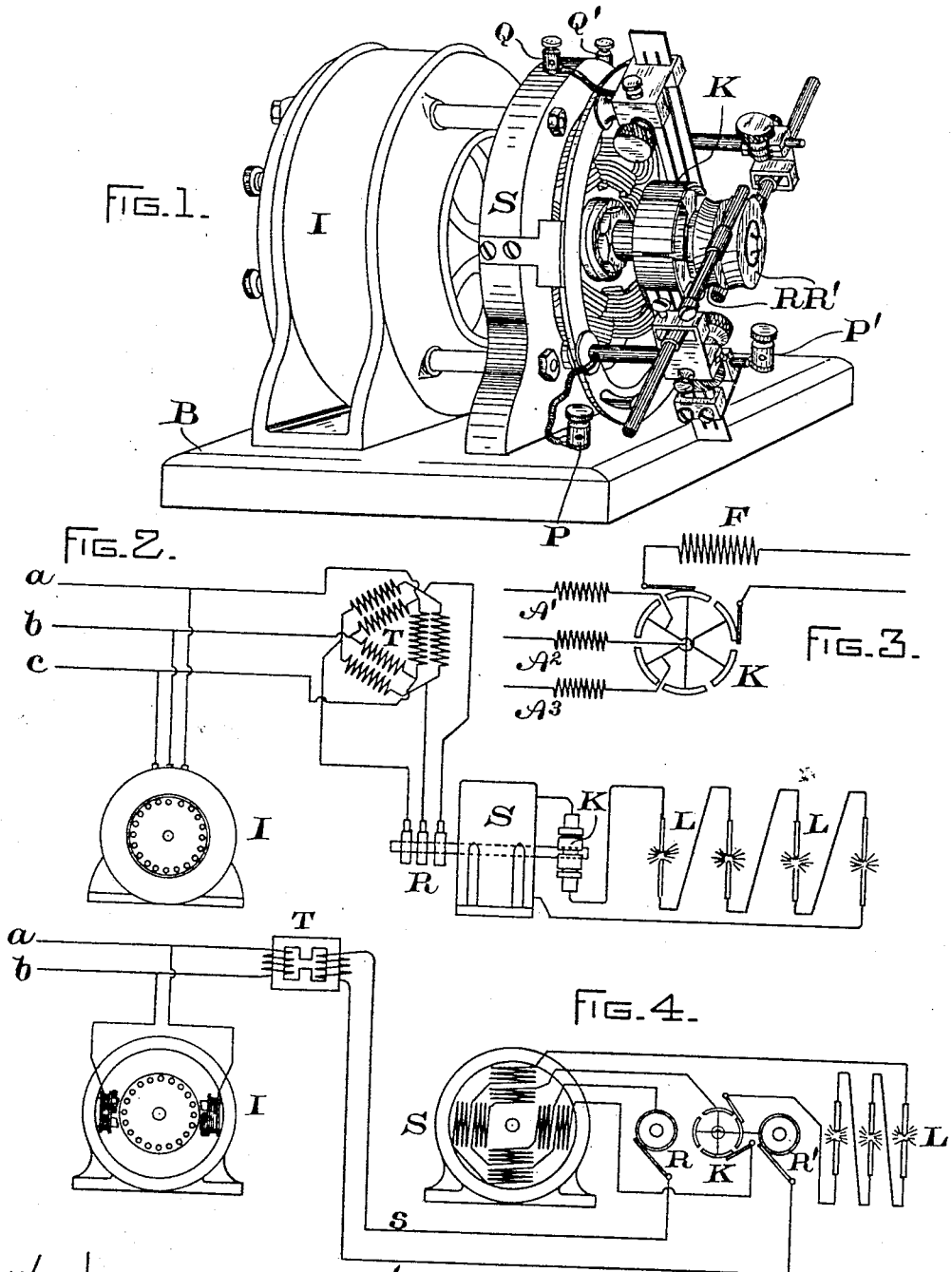
(No Model.)
E. THOMSON.
RECTIFIER.
No. 587,024.  Patented July 27, 1897.

ELIHU THOMSON, OF SWAMPSCOTT, MASSACHUSETTS, ASSIGNOR TO THE GENERAL ELECTRIC COMPANY, OF NEW YORK.

RECTIFIER.

SPECIFICATION forming part of Letters Patent No. 587,024, dated July 27, 1897.

Application filed October 31, 1896. Serial No. 610,655. (No model.)

*To all whom it may concern:*

Be it known that I, ELIHU THOMSON, a citizen of the United States, residing at Swampscott, in the county of Essex, State of Massachusetts, have invented certain new and useful Improvements in Rectifiers, (Case No. 449,) of which the following is a specification.

My invention relates to improvements in rectifiers, and especially to means for commuting alternating-current waves and turning the currents in a single direction, so as to send over a line a continuous or pulsating current for feeding devices requiring unidirectional currents for their best operation.

The object of my invention is to maintain a rectifying-commutator in exact synchronism with the pulses of alternating current to be commuted, and to do this notwithstanding the inductive lag which may exist in the alternating-current line or which may modify from time to time the phase relation between the prime source and the current to be commuted. In my improved apparatus the capacity for self-starting is obtained and a balance of forces brought about whereby the commutating action is precise and not subject to fluctuation or "hunting," as it is termed.

The invention will be better understood by reference to the accompanying drawings, in which—

Figure 1 is a perspective view of an apparatus embodying the invention, and Figs. 2, 3, and 4 are diagrams of circuits explanatory thereof.

Fig. 1 shows an induction-motor driven by alternating currents, a synchronizing-machine through the coils of which the alternating-current impulses to be commuted are passed, and a commutator for rectifying the pulses or giving the pulses a single direction. On a suitable base B is mounted an ordinary induction-motor I. Generally the stationary structure is used for the support of the coils in induction-motors. The type of induction-motor may be such as is adapted to be operated by polyphase currents or from a single alternating current, in which latter case it is provided with means for giving a starting torque sufficient to carry it up to synchronism. The armature of the induction-motor I is geared to or carries upon its shaft the armature or rotating portion of a synchronizing-machine S, which is like a small alternating-current generator, having field-poles excited by a continuous current and a number of armature-coils corresponding to the field-poles for each phase to be commuted. The armature is laminated, as is customary in such machines. On the same shaft is mounted a commutator K, having a number of segments corresponding to the poles in the field of the synchronizing-armature and connected, as usual, for commuting the impulses passing through the armature-coils. By sets of rings R R', insulated from the shaft, together with suitable brushes bearing on the rings, an alternating current from an outside source can be passed through the commutator and coils of the synchronizing-machine S. Binding-posts P P' are provided for connection to the outside alternating-current circuit to be commuted when a single-phase current is to be dealt with. With a three-phase current three-phase connections would be provided and three rings, while the segments of the commutator would be correspondingly increased. Brushes bear on the rings R R', one of which is connected to the binding-post P and the other to P'. Other brushes also bear upon the commutator K, and connections are carried from these brushes to posts Q Q', from which extends a circuit for arc-lamps or other devices through which the rectified current passes. These brushes may be made adjustable in the ordinary way for exact position with respect to the slots of a commutator to avoid spark.

In my invention the induction-motor has such a number of poles as will tend to cause the synchronizing-machine S to run faster than synchronizing speed, whereby the machine S becomes a "booster" or adds slightly to the electromotive force of the current passed through it. The field-magnet coils of the synchronizing-machine are preferably put in some part of the circuit from the commutator-brushes to the commutator K and receive magnetism therefore as an effect of the rectified current. One of the insulated rings, as R, is connected directly to one terminal of the winding on the armature of the machine S, the other terminal being connected to a set of segments alternating in position around the commutators, while the remaining segments are connected to the remaining ring directly, as R'. If the induction-motor I have four poles, then the synchronizing-machine S may have six poles, or a greater number than that of the induction-motor. This puts the induction-motor under load at all times and makes it tend to drive the synchronizing-machine, while the synchronizing-machine, having a tendency above synchronism, is under load as a generator, the driving torque of the induction-motor being balanced or nearly balanced, regardless of friction, by the drag of the armature of the synchronizing-machine working as a generator. By this arrangement there is no difficulty in starting the machine by using the induction-motor alone and afterward closing the circuit (when synchronism has been attained or somewhat surpassed) through the binding-posts by connection to the alternating-current source, after which the machine runs at synchronizing speed and commutes the current passed through it to the circuit attached to the direct current terminals Q Q'.

If polyphase currents are used, the connections may be such as are shown in Fig. 2. Here the induction-motor is fed by branches taken from three mains $a\ b\ c$. Three-phase transformers T transform the currents into three secondary circuits, the terminals of which may be attached to rings R on the shaft of the apparatus. At the same time the transformer T may be (as is now well understood in the art) made to produce inductively-alternating currents of fairly constant value, so that the currents delivered to R will differ from those coming from the mains $a\ b\ c$ in the fact that a certain current strength tends to be maintained in the lines leading to R, while only a constant potential is maintained on the lines $a\ b\ c$. The polyphase induction-motor I would, as stated before, have a less number of poles in its winding than the synchronizer S. The passage of the current through the three coils of the armature of S from the three rings at R would make the machine S an alternating-current three-phase generator driven by the polyphase induction-motor I, and the pulses of current after passing the armature-coils would be carried through the commutator and rectified for feeding the field-circuit and the circuit of arc-lamps L L.
In Fig. 3 is shown diagrammatically the arrangement of connections. The armature-coils are marked $A'\ A^2\ A^3$ and would be disposed on the armature in the ordinary succession of a three-phase generator. Each of these coils receives an impulse from one of the rings R in proper sequence, and after passing these coils the current is carried to the opposite segments of the commutator, while brushes resting on the segments commute the currents and carry them to the field-coil F and outside circuit. The overlap of the brushes on the commutator is made suitable for proper commutation, and the commutator shown would be one suited to a four-pole structure in the machine S, Figs. 1 or 2—that is, it would have six segments, the opposite ones connected, and brushes placed substantially at right angles to each other.

In single-phase rectifying the mains are as seen in Fig. 4, $a\ b$, and the induction-motor I is made self-starting by any device, such as the well-known "shaded pole." In the figure it is shown as having two poles. The constant-current transformer, transforming from the line $a\ b$ to the secondary $s\ t$, is shown at T.
This transformation may be effected in any of the ordinary ways, such as by a leakage-transformer, transformers with movable or repelled secondaries, &c., the tendency in the current in the line $s\ t$ being to a constant value. The generator S is shown with four poles, and will therefore tend to run slower at the same rate of alternation than the induction-motor I. The synchronizing-machine modifies the speed of the combined induction-motor and synchronizer. The connections from the line $s\ t$ conveying alternating currents are made through rings R R', as in Fig. 1, one ring being connected, as indicated, to a terminal of the armature or interior winding of the machine S, the other terminal being connected to a pair of diametrically opposite segments in the commutator K, while the other pair of segments are connected to the ring R'. Brushes on the commutator K in position at right angles relatively connect with the segments and with the circuit of lights L through the field-winding of the machine S. Fig. 4 is indeed a diagrammatic representation of the circuit connections such as would be used in the operation of a machine like Fig. 1. It is of course to be understood that the number of poles in each motor may be varied widely and increased or decreased, according to the speed desired, while the number of commutator-segments will follow the relation of the poles. In all cases, however, the tendency of the motor should be to carry the apparatus beyond synchronism so far as the synchronizing-machine is concerned, which is accomplished whenever the motor has such a lessened number of poles than the synchronizer as will give a speed somewhat above synchronism when the machine is driven by the induction-motor.

The arrangement of the machine as described, in which the impulses of alternating current pass through the synchronizer-machine S in a virtually series relation with the lights L, secures as a result that (no matter whether the phase relation of the currents in the line $s\ t$ with respect to the currents in the line $a\ b$ be constant or variable) the commutation is made with reference to the phases in the line $s\ t$ alone and always in a definite way, since the motor I tends to drive the coils of the synchronizer S a little beyond synchronism. The driving torque of the motor I is opposed by the drag or counter torque of the synchronizer S in resisting being driven beyond synchronism, and the counterbalancing of these two forces makes the commutation sharp.

It is of course to be understood that the excitation of the field-magnets of the synchronizing-machine S might be obtained from some other source than the current generated or commuted, but this is a minor element of my invention, of no particular consequence to the actions involved, it being more convenient generally to connect the field S in series with the lights L. It will be understood that any machine which tends to run by alternating currents, without reference to exact synchronism, may supplant the machine I for the purposes of my invention and may be regarded as the induction-motor. In fact, any source of power tending to drive the shaft of the synchronizing-machine S somewhat above synchronism might take the place of the induction-motor I in my rectifying apparatus, provided that the driving-machine does not actually force the machine S beyond synchronism, but merely tends to do so.

What I claim as new, and desire to secure by Letters Patent of the United States, is—

1. The improvement in the art of rectifying alternating current, which consists in passing the current through a rectifying device and by external power imparting to the rectifier a tendency to rotate at a speed greater than synchronism.

2. In combination, a rectifier, means for supplying the rectifier with alternating current, and an external source of power tending to drive the rectifier above synchronism.

3. In combination, alternating-current mains, a rectifying device supplied with current thereby, an electric motor upon the shaft of the rectifier, the motor arranged to run above synchronism for the rectifier at no load; whereby when under load the rectifier has a tendency to rotate at a speed slightly in excess of synchronism.

4. In combination, alternating-current mains, a rectifying device supplied with current thereby, and an alternating-current motor upon the shaft of the rectifier taking current from the mains, the number of poles in the motor being less than in the rectifier.

In witness whereof I have hereunto set my hand this 28th day of October, 1896.

ELIHU THOMSON.

Witnesses:
JOHN W. GIBBONEY,
HERMANN LEMP.